United States Patent [19]
Brewer

[11] Patent Number: 5,735,346
[45] Date of Patent: Apr. 7, 1998

US005735346A

[54] FLUID LEVEL SENSING FOR ARTIFICIAL LIFT CONTROL SYSTEMS

[75] Inventor: James Robert Brewer, Gaylord, Mich.

[73] Assignee: ITT Fluid Technology Corporation, Midlantic Park, N.J.

[21] Appl. No.: 639,564

[22] Filed: Apr. 29, 1996

[51] Int. Cl.⁶ .................................................. G21B 47/00
[52] U.S. Cl. ........................ 166/250.03; 166/250.15; 166/370; 166/372; 166/374; 166/375
[58] Field of Search ................ 166/250.03, 250.15, 166/370, 372, 374, 375

[56] References Cited

U.S. PATENT DOCUMENTS

| | | | |
|---|---|---|---|
| 2,524,933 | 10/1950 | Silverman | 166/250.03 |
| 4,150,721 | 4/1979 | Norwood | 166/53 |
| 4,211,279 | 7/1980 | Isaaks | 166/64 |
| 4,228,855 | 10/1980 | Sustek et al. | 166/250.03 |
| 4,480,697 | 11/1984 | Goldaviga et al. | 166/375 X |
| 4,633,954 | 1/1987 | Dixon et al. | 166/372 |
| 5,014,789 | 5/1991 | Clarke et al. | 166/372 |

*Primary Examiner*—Roger J. Schoeppel
*Attorney, Agent, or Firm*—Plevy & Associates

[57] ABSTRACT

The artificial lift control system utilizes a piggy back line, flow computer, pressure transmitter, and software control to control artificial lift of wellbore fluids. The piggy back line is a medium to high pressure line strapped to the outside of the tubing. Supply, make-up gas or other fluids are pumped down the piggy back line at the lowest flow rate possible. Extremely low flow rates are utilized to minimize friction of flow in the piggy back line. A pressure or differential pressure transmitter is installed to monitor pressure on the piggy back line or to measure the differential pressure between the piggy back line and the casing pressure. The flow computer monitors pressures or differential pressures, utilizes software instruction sets to calculate fluid levels in the casing tubing annulus, and cycles artificial lift on and off based on parameters set in the flow computer software.

28 Claims, 3 Drawing Sheets

FLUID LEVEL SENSING FOR ARTIFICIAL LIFT CONTROL SYSTEMS

FIELD OF THE INVENTION

The present invention relates to a control system for production wells, and more particularly, to a system and method for accurately determining fluid levels in a wellbore for optimum control of artificial lift systems employed to maintain production of the wells.

BACKGROUND OF THE INVENTION

During the production life of a well, typically, the natural reservoir pressure decreases as gases and liquids are removed from the formation. As the natural downward pressure of a gas well decreases, the well bore tends to fill upwards with fluids, such as oil and water, which block flow of the desired formation gas or fluid into the bore hole and reduce the output production of the well. In gas wells experiencing excessive fluid filling, artificial lift techniques are typically utilized to periodically remove the accumulated undesired fluids by artificial lift techniques which include plunger lift devices, gas lift devices and downhole pumps. In the case of oil wells within which the natural pressure has decreased to the point that formation oil does not flow under its own pressure to the surface, oil production is maintained by artificial lift methods such as downhole pumps and by gas injection lift techniques. Moreover, certain wells are stimulated into increased production by secondary recovery means employing the injection of water or gas into the formation to maintain reservoir pressure and to cause a flow of fluids from the formation into the wellbore. For oil and gas wells with insufficient reservoir pressure to force the fluid to the surface, plunger lifting and gas lifting based techniques are commonly used.

Plunger lift techniques include the use of a cylindrical plunger which travels through tubing extending from a location near the producing formation down in the borehole to surface equipment located at the open end of the borehole. Generally, fluids which collect in the borehole and inhibit flow of fluids out of the formation and into the well bore, are collected in the tubing. Periodically the end of the tubing is opened at the surface and the accumulated reservoir pressure is sufficient to force the plunger up the tubing. The plunger carries with it to the surface a portion of the accumulated fluids which are ejected out the top of the well thereby allowing the gas to flow more freely from the formation into the wellbore to be delivered to a distribution system at the surface. After the flow of gas has become restricted due to the further accumulation of fluids downhole, a valve in the tubing at the surface of the well is closed so that the plunger then falls back down the tubing and is ready to lift another load of fluid to the surface upon reopening the valve.

Gas lift techniques include a valve system for controlling the injection of pressurized gas from a source external to the well, such as another gas well or a compressor, into the borehole. The increased pressure from the injected gas forces accumulated formation fluids up a central tube extending along the borehole to remove the fluids and restore the free flow of gas or oil from the formation into the well. In wells where liquid fall back is a problem during gas lift, plunger lift may be combined with gas lift to improve efficiency.

Both the plunger lift and gas lift techniques require periodic operation of a motor valve at the surface of the well head to control either the flow of fluids from the well or the flow of injection gas in the well to assist in the production of gas and liquids from the well. These motor valves are conventionally controlled by timing mechanisms and are programmed based on length of time that a well should be shut in and restricted from flowing gas or liquids to the surface and the time that a well should be opened to freely produce. Generally, the criteria used for operation of the motor valve is strictly one of the elapse of a preselected time period. In most cases, measured well parameters, such as pressure, temperature, etc. are used only to override the timing cycle in special conditions.

U.S. Pat. No. 4,211,279, entitled "PLUNGER LIFT SYSTEM", issued Jul. 8, 1980 to Isaacks, discloses a plunger catcher and trip assembly wherein a conventional timer or controller determines the interval during which gas lift is injected into the annulus between the casing and the tubing and the time interval during which the plunger is held within the well head by the catcher and trip assembly. The controller disclosed in Isaacks operates on preselected time intervals and is manually adjusted to vary the injection period and stabilization period for optimum production of formation fluids.

U.S. Pat. No. 4,633,954, entitled "WELL PRODUCTION CONTROLLER SYSTEM", issued Jan. 6, 1987 to Dixon et al., discloses a control system with provisions for monitoring tubing, casing and production flow line pressure for optimum control of production from plunger lift wells. The controller timing of operations is based on reservoir engineering principles relating certain pressure/flow relationships in a well to the optimum production from the well.

U.S. Pat. No. 5,014,789, entitled "METHOD FOR STARTUP OF PRODUCTION IN A WELL", issued May 14, 1991 to Clarke et al., discloses a method of controlling production in a well wherein flow rate is monitored and a flow regulating device in the flow path from the well is controlled in accordance with the monitored flow rate. The flow rate is reduced when the monitored flow rate is indicative of an onset of slugging, such as when an increase in flow rate is detected.

None of the above patents disclose the present invention of annular fluid level sensing and artificial lift control using annular fluid level. The annular fluid level being determined through the unique use of a piggy back line, a device sensing pressure in the piggy back line, a static pressure sensing device in the gas being fed through the piggy back line, and running the piggy back line to the bottom of the well bore where the production tubing ends.

Accordingly, it is an object of the present invention to provide a method and a system for fluid level sensing in a well for controlling artificial lift systems used in the well.

SUMMARY OF THE INVENTION

The present invention entails a method for determining the fluid level in a well casing for controlling artificial lift systems based on the determined fluid level. Through a piggy back line running along the tube leading to the bottom of the well, a gas is introduced at a very low flow rate so as to have negligible frictional flow. When the pressure of the gas overcomes the hydrostatic pressure from the fluid column, the gas bubbles up through the fluid column providing a steady pressure reading in the piggy back line. A pressure sensor detects any residual gas pressure in the annular space in the well casing not yet occupied by the fluid. A flow computer is provided the pressure of the piggy back line and any residual gas pressure, and the density of the fluid for determining the annular fluid level in the casing.

The flow computer in accordance with software configuration controls the artificial lift system based on the determined annular fluid level. Through wired connections to motor actuated valves and electrical switches in supply lines and production lines to the well casing, the flow computer can utilize the piggy back line method for detection of actual annular fluid level to control various artificial lift systems.

BRIEF DESCRIPTION OF THE DRAWINGS

The invention will be better understood with reference to the following illustrative and non-limiting drawings, in which.

DETAILED DESCRIPTION OF THE INVENTION

Although the present invention can be used in many different applications where annular fluid level sensing is desired, the present invention is especially suited for use with artificial lift systems. Accordingly, the present invention will be described in conjunction with control of artificial lift systems in a production well based on annular fluid level sensing in the well.

Figure 1:
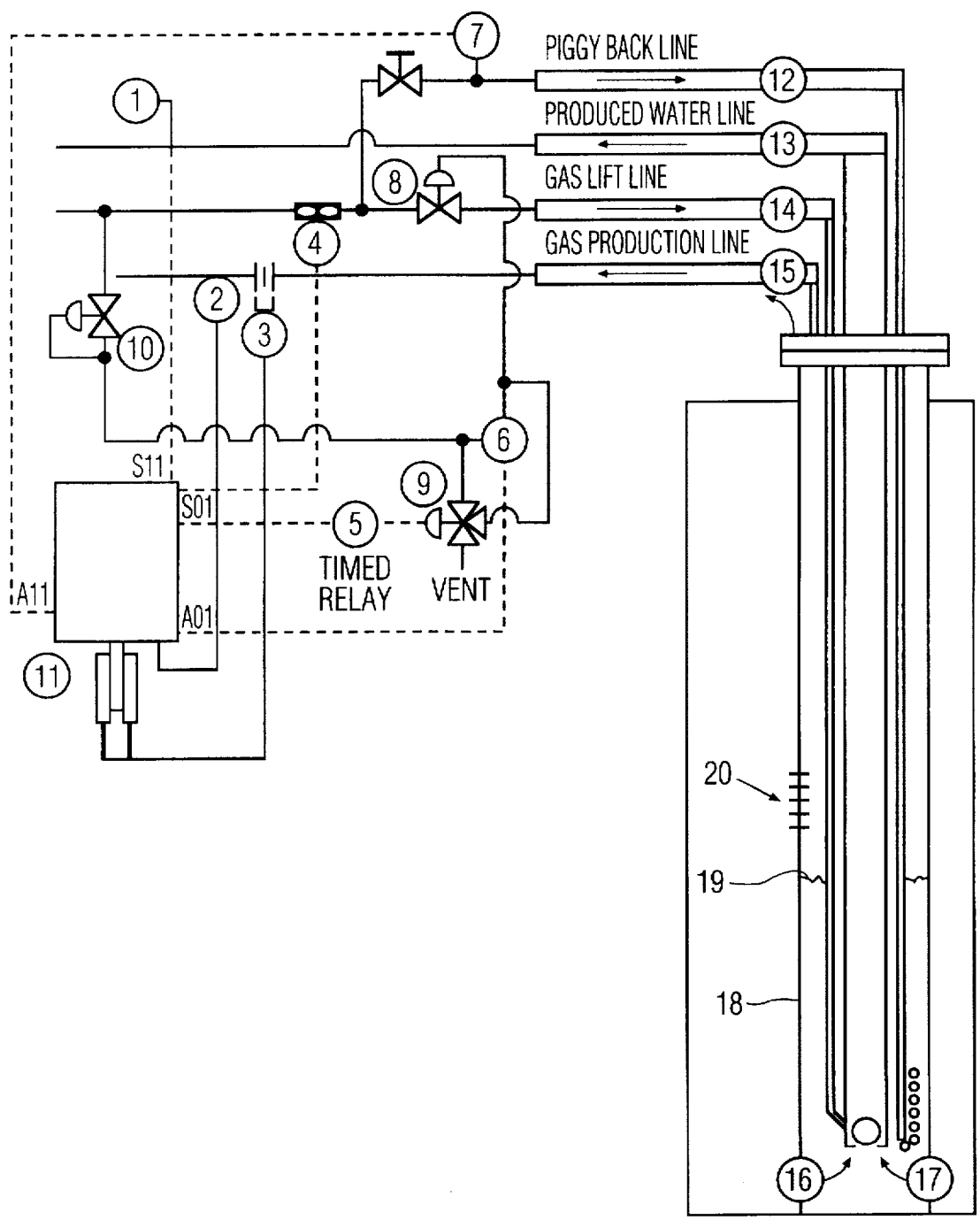
FIG. 1 is a schematic of a an artificial lift system employing annular fluid level sensing in accord with the present invention.

Artificial lift provides additional energy to lift wellbore fluids from deep within the earth to the surface. In low pressure reservoirs, the goal is usually to keep wellbore fluids below the perforations in the well casing where formation fluid seeps into the well. This reduces backpressure on the formation and maximizes production in most wells. Wells that produce insufficient fluids for continuous lift utilize timers to cycle on and off artificial lift systems such as pumping units, progressive cavity pumps, and intermittent gas for gas lift wells. The problem is guessing the proper time cycles to obtain the maximum production with the minimum amount of energy. Since the goal is to keep fluid levels below the perforations, on and off time cycles are simply the operator's best guess rather than based on the actual fluid level int the wellbore. The present invention solves this problem by continually calculating the fluid level in a wellbore and cycling the lift on and off as needed to accomplish the goal of keeping the fluid level below the perforations Referring now to FIG. 1 there is shown a modified gas lift system with well bore and surface connections for controlling lift operations based on determined annular fluid levels. A flow computer 11 is shown which receives information from various electrical pressure and temperature sensing devices and controls switches or valves to operate an artificial control lift system accordingly. Programmable controllers, well known in the art, can be utilized to implement the process controls of the flow computer. The flow computer is configured with software instruction sets for receiving sensed measurements and controlling switches and motor actuated valves for performing the desired process control. Optimal production from the well occurs when the fluid level 19 is below the perforations 20 in the well casing 18. With the fluid level 19 below the perforations 20, gas in the surrounding formation, not being restricted by any fluid, seeps through the perforations into the well casing for collection through the production gas line 15. Accordingly, for optimal operation of the artificial lift system, the flow computer 11, utilizing the fluid level sensing in accord with the present invention, cycles the artificial lift system to maintain fluid levels 19 in the well casing 18 below the perforations 20.

A pressure switch 1 is located in the water flow line. The flow computer monitors the pressure switch 1 and shuts off flow in the gas lift line when flow in the produced water line exceeds a set point pressure. An electrical temperature sensing device 2 monitors temperature in the gas flow line and sends the temperature readings back to the flow computer 11. A differential pressure and static pressure sensing device 3 that measures differential pressure across an orifice plate in the gas production line transmits data back to the flow computer where the static pressure and differential pressure are utilized to calculate gas flow rates. A gas turbine meter 4 on the gas lift line sends out electrical pulses each time the magnetized blade of the propeller passes a point on the housing. The flow computer 11 uses these pulses to calculate a gas lift injection rate. A timed relay 5 is used for intermittent gas lift operations. An analog input to pressure converter 6 receives electrical data from the flow computer and converts it to a pressure output to control gas lift through a motor valve 8 in the gas lift line. An electrical pressure sensing device 7 monitors pressure in the piggyback line and sends data back to the flow computer which uses the data and static pressure data from device 3 to calculate fluid levels in the well bore. The motor valve 8 regulates the rate of lift of injected gas into the gas lift line. A solenoid valve 9 fed by the timed relay controls the intermittent lift as a bypass circuit around the converter 6 which controls motor valve 8. A pressure regulator 10 drops the gas lift line pressure to the motor valve 8, and analog to input pressure converter 6, to the appropriate working pressures.

Annular fluid level sensing and artificial control using annular fluid level data requires the piggy back line 12, piggy back pressure sensing device 7, static pressure sensing device 3, and the bottom of the piggy back line where gas bubbles up through the annular fluid column 17 in the well casing 18. The flow computer calculates flow rates, fluid levels, monitors pressure, and calculates gas lift rates. The piggy back line 12 runs from the surface to the bottom of the well along with the tubing 16 which extends from the surface to the bottom of the wellbore.

The water flow line 13 takes water and lift gas from the tubing 16 back to the facility. The gas lift line 14, which extends from the surface to the bottom of the tubing 16, supplies pressurized gas to force accumulated water in the well up to the surface or collection. The gas lift line 14 is connected to the tubing 16 in a mandrel which ports all lift gas into the bottom of the tubing 16. The gas production flow line 15 takes production gas from the wellbore annular space to a facility on the surface. The bottom of the piggy back line 17 is where gas slowly bubbles out of the line and up through the fluid column in the annular space. The gas bubbling up through the fluid column relieves pressure in the piggy back line exceeding the hydrostatic pressure of the fluid column and any pressure due to residual gas in the annular space in the well casing 18 not filled with fluid.

Annular fluid levels are determined by injecting a very small rate of gas into the piggy back line 12. The electronic pressure sensing device 7 measures the pressure required to bubble up gas through the annular fluid column. Since friction is negligible for extremely low flow rates and since hydrostatic pressures created by a column of dry gas is very low, the pressure measured by the electronic pressure sensing device 7 is very close to the pressure at the bottom of the tubing 16 and the bottom of the piggy back line 17. It is well known under nodal analysis methodology that only one pressure and one temperature can exist at any one given point. Accordingly, the pressures at the bottom of the tubing and the bottom of the piggy back line are equal to the hydrostatic pressure exerted by the fluid and gas column in the annular space. Static pressure sensing device 3 measures the pressure in the annular space. Since the hydrostatic pressure generated by the gas is negligible, the difference between the pressure at the bottom of the piggy back line 17 and the pressure of any gas remaining in the well casing above the fluid column, as measured by the static pressure sensing device 3, is due to the pressure generated by the fluid column in the annular space. It is known that the pressure of a static fluid column at a given depth is equal to the given depth times the pressure gradient of the fluid. Therefore, the fluid column depth in the annular space can be determined from dividing the pressure at the bottom of the fluid column less any pressure from residual gas above the filled column by the pressure gradient of the fluid. The pressure at the bottom of the tubing or fluid column being the difference in pressure between the pressure at the bottom of the piggy back line, as indicated by sensing device 7, and the pressure of any production gas in the annular space, as indicated by pressure sensing device 3. Where the residual gas has not filled the annular space above the fluid column sufficiently or is vented from the well casing, the pressure at the bottom of the tubing or fluid column is due to the hydrostatic pressure of the fluid, as indicated by sensing device 7.

Once the fluid level is known, various control procedures can be programmed into the flow computer. The flow computer can be programmed to cycle progressive cavity pumps and pumping units on and off based on user set fluid levels. The flow computer can control the injection rate of continuous gas lift as well control intermittent gas lift for the remaining life of the well. For example, the flow computer can be configured for continuous gas lift operations for the first six months to a year, and then intermittent gas lift operations for the remaining life of the well. For continuous lift operations, the flow computer will calculate the fluid level and control the gas injection rate. The flow computer will monitor the fluid level for a set period of time, compare it to the previous period, and increase gas lift rate if the fluid level rises and decrease gas lift rate if the fluid level decreases. For intermittent lift operations the flow computer will monitor the fluid level and cycle the lift on when the fluid level reaches a set point. This type of process can also be utilized to turn pumping units on when the fluid level reaches a certain set point.

Figure 2:
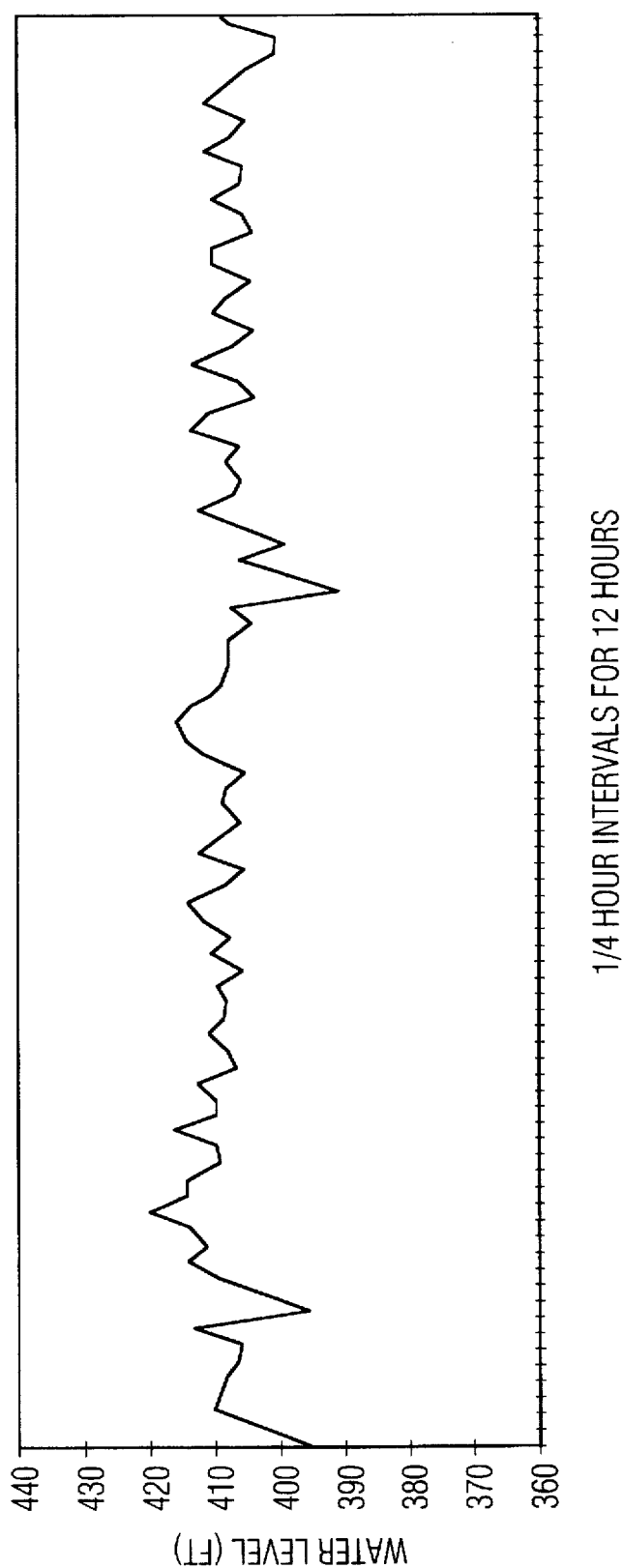
FIG. 2 is a graph of the measured water level in a test well with an artificial lift system employing control based on the present invention.
Figure 3:
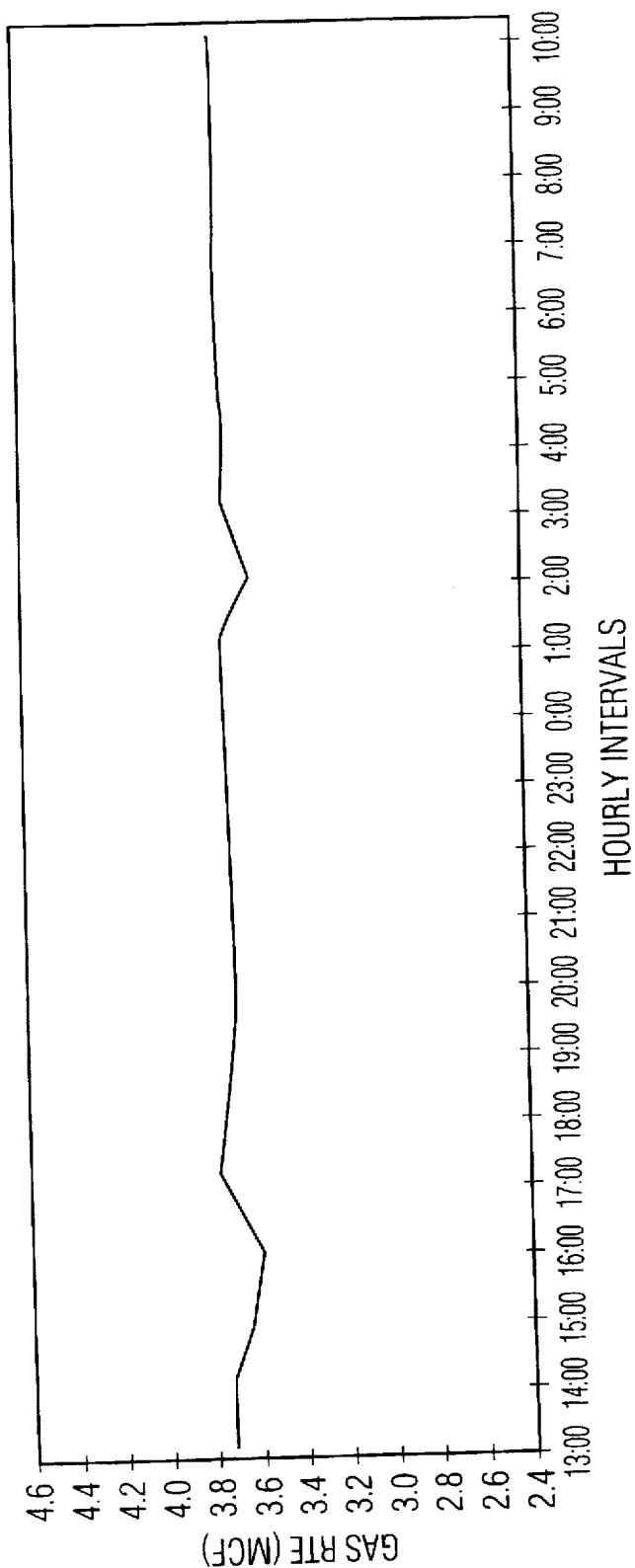
FIG. 3 is a graph of the hourly production gas rate for the test well of FIG. 2

Referring now to FIGS. 2 and 3, there are shown graphs of data from test wells employing artificial lift control based on annular fluid level sensing in accord with the present invention. The graph in FIG. 2 relates the measured water level in feet above the bottom of the piggy back line over a twelve hour (12 hr) period at quarter hour (¼ hr) intervals. The flow computer or controller is programmed with a set point of four hundred ten feet (410'). When the measured water level reaches 410' the controller opens a gas lift valve to allow lift gas to flow down the gas lift line and propel a plunger pushing water to the surface thereby lowering the annular fluid level. In some instances, the fluid level rises slightly above 410' due to timing relays in the control system which introduce some delay. The graph in FIG. 3 relates the hourly gas rates for the production well of FIG. 2 over the same 12 hour period. The constant hourly gas rate of FIG. 3 indicates that the controller is adequately maintaining the annular fluid level below the perforations in the well casing, thereby maximizing gas production. Were the fluid level to reach the perforations, the production gas from the surrounding formation would be held back by the fluid level resulting in a cycling of the gas rate.

It should be understood that the embodiment described herein is merely exemplary and that a person skilled in the art may make many variations and modifications to this embodiment utilizing functionally equivalent elements to that described herein. Any and all such variations or modifications as well as others which may become apparent to those skilled in the art, are intended to be included within the scope of the invention as defined by the appended claims.

What is claimed is:

1. A system for determining a liquid level of a column of liquid contained in a well for controlling an artificial lift system for said well based on said liquid level of said column of liquid, comprising:

introduction means for introducing a gas adjacent to a bottom of said column of liquid, said gas being introduced at a predetermined rate of flow so as to exhibit a predetermined negligible mount of pressure resistance due to frictional liquid flow and sufficient to overcome a pressure exerted by said column of liquid adjacent to a bottom of said well;

sensing means fluidly coupled to said introduction means, for sensing a pressure at which said gas overcomes said pressure exerted by said column of liquid adjacent the bottom of said well, said column of liquid exhibiting a predetermined pressure gradient which depends upon the liquid level of said column of liquid; and, processing means responsive to said sensing means, for determining the liquid level of said column of liquid from said pressure exerted by said column of liquid and said predetermined pressure gradient.

2. The system according to claim 1, wherein said liquid level is an annular liquid level inside said well.

3. The system according to claim 1, wherein said processing means determines said liquid level from dividing said pressure at said bottom of said column of liquid by said predetermined pressure gradient.

4. The system according to claim 1, wherein said processing means also controls a gas lift system fluidly coupled to said column of liquid in said well by controlling the injection rate of gas being introduced into said well based on comparing the determined liquid level against a predefined liquid level.

5. The system according to claim 4, wherein said processing means also controls said gas lift system intermittently through a timed relay connection to a motorized valve in the gas lift supply to said well.

6. The system according to claim 1, wherein said processing means also controls the cycling of pumping units fluidly coupled to said column of liquid in said well, which remove said liquid in said well based on comparing the determined liquid level against a predefined liquid level.

7. The system according to claim 1, wherein said processing means also controls a plunger lift system fluidly coupled to said column of fluid in said well for removing said liquid based on comparing the determined liquid level against a predefined liquid level.

8. The system according to claim 1, wherein said introduction means is a piggy back line running from the surface to said bottom of said column of liquid so as to permit said gas to bubble up through said column of liquid when the pressure of said gas overcomes the pressure at said bottom of said column of liquid.

9. The system according to claim 8, wherein said sensing means is a pressure transducer converting the pressure sensed in said piggy back line to electrical information transmitted to said processing means over a wired connection between said pressure transducer and said processing means.

10. The system according to claim 8, wherein said processing means is a programmable controller configured with software instructions for determining said liquid level, said processing means having knowledge of said predetermined pressure gradient of said column of liquid.

11. A system for determining a liquid level of a column of liquid in a well for controlling an artificial lift system for said well, based on said liquid level of said column of liquid, comprising:

introduction means for introducing a gas adjacent to a bottom of said column of liquid, said gas being introduced at a predetermined rate of flow so as to exhibit a predetermined negligible amount of pressure resistance due to frictional liquid flow and sufficient to overcome a hydrostatic pressure of said column of liquid adjacent a bottom of said well;

sensing means fluidly coupled to said introduction means, for sensing a pressure at which said gas overcomes said hydrostatic pressure of said column of liquid adjacent the bottom of said well, said column of liquid having a predetermined pressure gradient;

second sensing means coupled to a space in said well for sensing a pressure of any residual gas in said space of said well not yet occupied by said column of liquid; and, processing means responsive to said sensing means and said second sensing means, for determining said liquid level based on said predetermined pressure gradient and the difference between said hydrostatic pressure of said column of liquid and said pressure of any residual gas.

12. The system according to claim 11, wherein said liquid level is an annular liquid level.

13. The system according to claim 11, wherein said processing means determines said liquid level from dividing the difference between said pressure at said bottom of said column of liquid and said pressure of any residual gas by said predetermined pressure gradient.

14. The system according to claim 11, wherein said processing means also controls a gas lift system fluidly coupled to said column of liquid in said well by controlling the injection rate of gas being introduced into said well based on comparing the determined liquid level against a predefined liquid level.

15. The system according to claim 14, wherein said processing means also controls said gas lift system intermittently through a timed relay connection to a motorized valve in the gas lift supply to said well.

16. The system according to claim 11, wherein said processing means also controls the cycling of pumping units fluidly coupled to said column of liquid in said well, which remove said liquid in said well based on comparing the determined liquid level against a predefined liquid level.

17. The system according to claim 11, wherein said processing means also controls a plunger lift system fluidly coupled to said column of fluid in said well for removing said liquid based on comparing the determined liquid level against a predefined liquid level.

18. The system according to claim 11, wherein said introduction means is a piggy back line running from the surface to said bottom of said column of liquid so as to permit said gas to bubble up through said column of liquid when the pressure of said gas overcomes the pressure at said bottom of said column of liquid.

19. The system according to claim 18, wherein said sensing means and said second sensing means are each a pressure transducer converting the pressure sensed in said piggy back line to electrical information transmitted to said processing means over a wired connection between said pressure transducer and said processing means.

20. The system according to claim 19, wherein said processing means is a programmable controller configured with software instructions for determining said liquid level, said processing means having knowledge of said predetermined pressure gradient of said column of liquid.

21. A method for determining a liquid level of a column of liquid in a well for controlling an artificial lift system for said well, based on said liquid level of said column of liquid, said method comprising:

introducing a gas adjacent to a bottom of said column of liquid at a predetermined rate of flow so as to exhibit a predetermined negligible amount of pressure resistance due to frictional liquid flow and sufficient to overcome a hydrostatic pressure of said column of liquid adjacent a bottom of said well;

sensing through a fluid coupling a pressure at which said gas overcomes said pressure at the bottom of said column of liquid in said well, said column of liquid having a predetermined pressure gradient; and, sensing through another fluid coupling a pressure of any residual gas in a space of said well not yet occupied by said column of liquid; and, determining said liquid level based on said predetermined pressure gradient and the difference between said pressure adjacent said bottom of said column of liquid and said pressure of any residual gas.

22. The method according to claim 21, wherein said liquid level is an annular liquid level in said well.

23. The method according to claim 21, wherein said liquid level is determined by dividing the difference between said pressure at said bottom of said column of liquid and said pressure of any residual gas by said predetermined pressure gradient.

24. The method according to claim 21, further including the step of controlling a gas lift system in said well by controlling the injection rate of gas being introduced into said well based on comparing the determined liquid level against a predefined liquid level.

25. The system according to claim 24, further including the step of controlling said gas lift system intermittently through a timed relay connection to a motorized valve in the gas lift supply to said well.

26. The method according to claim 21, further including the step of controlling the cycling of pumping units removing said column of liquid in said well based on comparing the determined liquid level against a predefined liquid level.

27. The method according to claim 21, further including the step of controlling a plunger lift system in said well for removing said column of liquid based on comparing the determined liquid level against a predefined liquid level.

28. The method according to claim 21, wherein said step of introducing a gas to the bottom of said column of liquid is through a piggy back line running from the surface to said bottom of said column of liquid so as to permit said gas to bubble up through said column of liquid when the pressure of said gas overcomes the pressure at said bottom of said column of liquid.

* * * * *